United States Patent Office 3,558,395
Patented Jan. 26, 1971

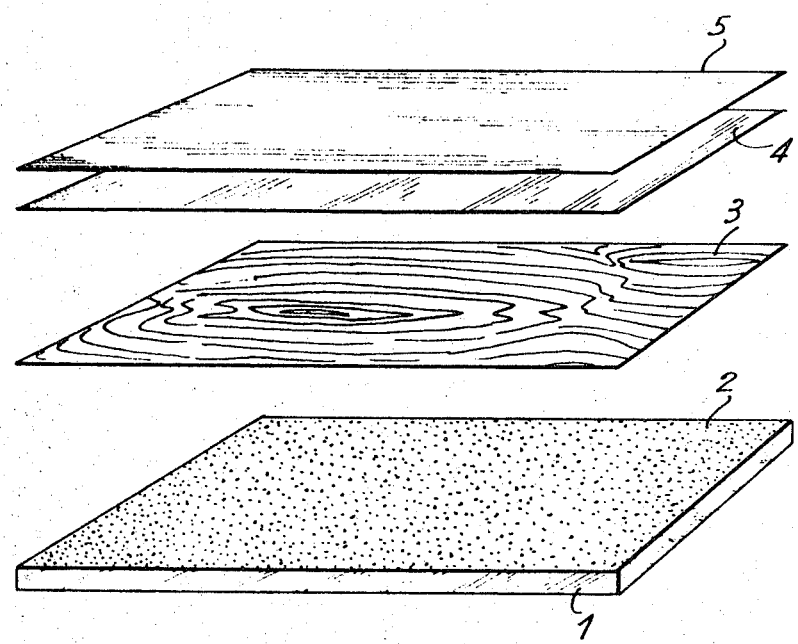

3,558,395
METHOD OF MAKING A LAMINATED DECORATIVE SHEET
Alain Edouard Plegat, Asnieres, France, assignor to Societe Anonyme des Usines Chausson, Asnieres, France, a company of France
Filed Dec. 18, 1967, Ser. No. 691,507
Claims priority, application France, Jan. 4, 1967, 89,973
Int. Cl. B29b 1/14
U.S. Cl. 156—246                     5 Claims

ABSTRACT OF THE DISCLOSURE

Process for making stratified sheets, plates and other objects and synthetic resin intended to have a glossy or dull appearance in which a support is prepared, one face of this support being subjected to a preliminary polishing, then to a controlled frosted glass operation, a nonpolymerized resin is sprayed on to said face, said resin being charged with a colored pigment or a porous decorative element being spread on said resin said porous element is then impregnated by the resin, successive coats of reinforcement are also impregnated with resin and the polymerizing of the whole is proceeded with before withdrawing the stratified assembly from its support.

---

The present invention relates to the making of sheets, plates or panels formed by a stratified resin reinforced particularly by means of glass fabric, said sheet, plate or panel being required to have a decorative dull surface.

The invention seeks more particularly to provide such sheets, plates or panels, flat as well as curved, which must imitate the appearance of various kinds of wood.

The invention, although it can be put into operation by utilizing other resins, seeks more particularly to produce sheets, plates or panels referred to above, made of polyester resin.

According to the invention, one face of a support is prepared by subjecting this face to a preliminary polishing, then to a controlled frosted glass operation, a nonpolymerized resin is deposited on said prepared face, a porous decoration is then spread on said resin, the porous element is then impregnated by the resin, successive reinforcing coats are then made available that are also impregnated with resin and the polymerization is proceeded with before withdrawing the stratified assembly from its support.

Various other characteristics of the invention will moreover be revealed by the detailed description which follows.

Form of embodiment of the object of the invention is shown, by way of nonrestrictive example, in the attached drawing.

The single figure is a diagrammatical perspective view showing how the invention is put into operation.

According to the process of the invention, firstly, a rigid support is prepared designated by 1 in the drawing. This support can be made of various materials, particularly of glass, metal, and even, if so required, of synthetic resin, provided that the resins used are sufficiently hard when they are polymerized and that they are able to stand up to temperatures in the region of 120° C. The working face 2 of the support 1 is first of all polished, so that there are neither scratches nor roughnesses on it. In a second operation, the surface 2 is given a frosted glass appearance, which can be done in various ways, according, on the one hand, to the kind of material used for making the support, and on the other hand, the feel and appearance that it is wished to impart to the sheet or plate to be made.

When the support 1 is made of glass, the working face 2 receives a frosted glass treatment with acid which can be more or less prolonged, according as to whether the plate or sheet to be made must have a gloss or very dull appearance. Another possibility of frosting the face 2 consists of sand blasting it, but this treatment is preferably used when said support is made of metal or synthetic resin. In this case also, great precautions should be taken to see that the sand blasting is uniform and, that it is done with sand particles that are carefully gauged, and that its putting into operation is rigorously uniform.

Then, to make the sheet or plate, an impregnation of the prepared support is first of all done, as explained in the foregoing, with a nonpolymerized polyester resin. This impregnation is done preferably by spraying with a gun a colorless thin coat of a polyester resin.

A second operation consists of applying a decorative element to the impregnation coat covering the face 2 of the support 1. In the example shown in the drawing, the decorative element is made of a porous paper or very thin felt, which has been printed, for instance, so as to simulate wood. The positioning of the decorative element, which is designated by 3, must be done very carefully so that this element has no creases. The decorative element 3 is then impregnated with the polyester resin, which is preferably, also done with the spray gun.

Then, it is only necessary to put suitable reinforcements in position, which are either impregnated on the spot, or impregnated with resin beforehand; these reinforcements can consists of one or more coats of glass fabric 4 or one or more coats of glass fibre or other material 5. The impregnating of these reinforcement coats can be done by any known means in this technique, particularly with a spray gun, paintbrush, trowel, etc., and by mechanical means.

Pressure is then exerted on the stratified article thus prepared, at the same time that it is heated in order to make the polymerization permeate. The heating operation, as well as the operation for applying pressure, are moreover optional, if the resins used sufficiently incorporate polymerization accelerators and if rolling takes place before permeating polymerization.

When polymerization is sufficiently advanced, the stratified material made is removed from the support 1, and it will be seen that the face of this stratified article, which was in contact with the surface 2, has a dull or glossy apparance according to the state of roughness of said surface 2.

The appearance, when the decorative element 3 simulates a kind of wood, is quite comparable to that of a natural wood, both with regard to its feel as well as from the visual standpoint.

The invention is not restricted to the example of embodiment shown and described in detail, for various modifications can be applied to it without going outside of the scope of the invention. In particular, when the stratified sheet or plate to be manufactured must be coloured in a regular manner and have a dull appearance, it is not always necessary to use the decorative element 3, and in this case, the impregnating coat with is first of all put on the face 2 of the support 1, is simply charged with colored pigments. Likewise, the invention can be put into operation in a similar manner for obtaining curved elements, for it suffices in this case that the support 1 has a curved face 2.

I claim:
1. A method of making a decorative sheet comprising the steps of providing a molding support sheet, treating one surface of said sheet to give it a predetermined appearance, spraying a coat of nonpolymerized substantially transparent resin onto said treated surface, applying a decorative member onto said coat of resin, impregnating said member with nonpolymerized resin, applying a reinforcing sheet on top of said decorative member, thereafter curing said resin until it is polymerized, letting said resin set until it froms a single unit structure with said decorative member and reinforcement member, and removing it from said support.

2. The method of claim 1 wherein said support sheet is metal and said treating consisting of polishing it.

3. The method of claim 1 wherein said support sheet is glass, and said treating consists of frosting said surface with an acid.

4. The method of claim 1 wherein said support sheet is metal and said treating consists of sandblasting it.

5. The method of claim 1 wherein said resin is colored pigment, and said decorative member is porous and is printed to simulate a wood grain.

References Cited
UNITED STATES PATENTS

| | | | |
|---|---|---|---|
| 2,502,758 | 4/1950 | Short | 156—246X |
| 3,014,828 | 12/1961 | Reese | 156—247X |
| 3,159,525 | 12/1964 | Finger | 156—247X |
| 3,257,252 | 6/1966 | Keel | 156—247X |
| 3,265,548 | 8/1966 | Harkins et al. | 156—247X |
| 3,438,838 | 4/1969 | Pellicer et al. | 156—247X |

BENJAMIN R. PADGETT, Primary Examiner

S. J. LECHERT, Jr., Assistant Examiner

U.S. Cl. X.R.

156—153, 247, 277, 289; 161—192, 413